May 13, 1952     G. B. ESPEY ET AL     2,596,474
FISHING LURE
Filed June 30, 1947
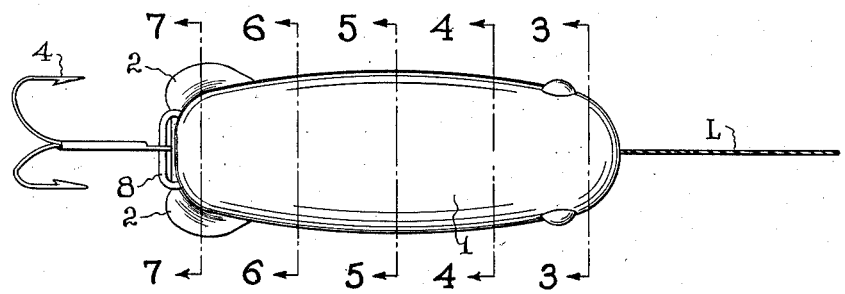
FIG. 1
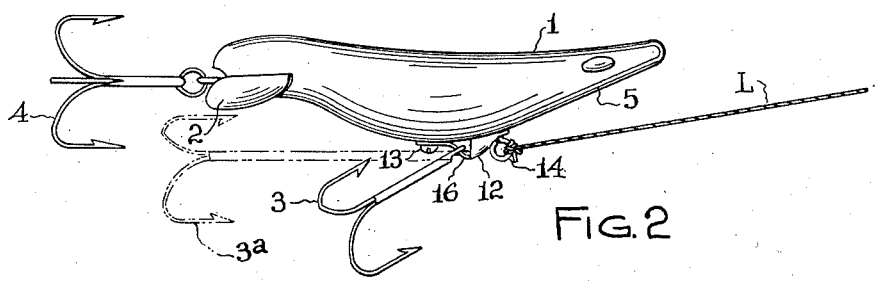
FIG. 2
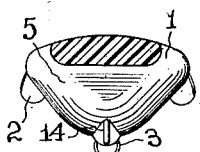 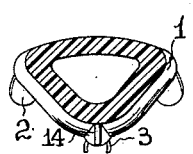 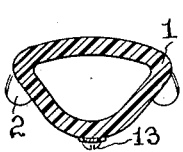 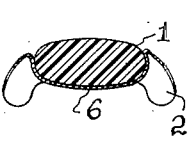
FIG. 3    FIG. 4    FIG. 5    FIG. 6    FIG. 7
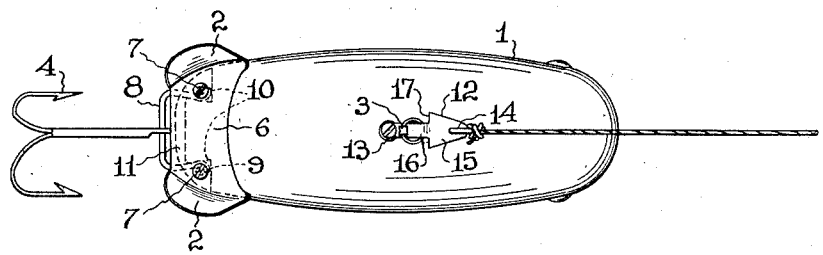
FIG. 8
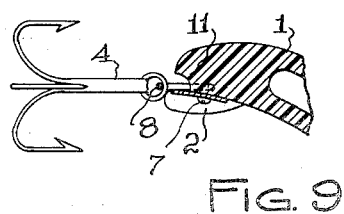
FIG. 9
INVENTORS.
GEORGE B. ESPEY
GILBERT D. WAITE
BY
ATTORNEYS Patented May 13, 1952

2,596,474

UNITED STATES PATENT OFFICE 2,596,474

FISHING LURE

George B. Espey and Gilbert D. Waite, Cleveland, Ohio

Application June 30, 1947, Serial No. 758,012

1 Claim. (Cl. 43—42.44)

This invention relates to improvements in artificial fishing lures which have particular advantage in surface plugs which are adapted to take a sinuous wriggling motion when drawn through the water.

It has been generally recognized that a lure or plug which has an "action" imitative of the natural swimming motion of a fish or the struggling action of a crippled fish, insect or small animal is most effective in attracting fish. A number of plugs of varying effectiveness so far as action is concerned have been produced, but of these the most effective have been not surface plugs but underwater plugs. The underwater plugs depend upon attachments generally in the form of cups, scoops or the like which serve the double function of causing a plug to travel at a substantial depth below the surface of the water and inducing the desired action. Alteration or removal of these attachments to cause such plugs to rise and travel upon or closely adjacent the surface serves also to deaden or kill completely their formerly effective action.

Since such cups or scoops are not suitable for use with surface plugs, surface plugs present more difficulties in obtaining the desired action. As a general rule most surface plugs of the prior art fail to have a pronounced wriggling or darting action but instead rely mainly on a splashing, gurgling and similar noise making ability to attract the attention of fish. Yet, under certain and/or many fishing conditions, the season, the time of day, water conditions, insect activity and other factors cause fish to rise and feed at the surface. At such times an underwater plug is useless or relatively futile and an effective surface plug is most to be desired.

We have observed that many factors which have been largely disregarded in the prior art determine the effectiveness or ineffectiveness of a bait. In many instances lines have been attached to plugs at points which restrict the action of the plug, without regard to planing surfaces, fins and/or streamlined portions of the plug and without regard to points of balance and unbalance. The proper distribution of weight, the location of the center of gravity, and the center of buoyancy with regard to such planing surfaces and with regard to the point of line attachment and the influence which all these factors exert upon the facility with which the plug can change direction has been to a large extent ignored. The effect of hooks which by reason of their inertia and shape tend to act like rudders or keels maintaining a plug in a straight course and in any event making its action sluggish and reducing its appeal substantially also has been largely overlooked in the prior art.

It is a general object of our invention, therefore, to provide a fishing plug which has none of the disadvantages of the prior art and which is designed to take advantage of the above mentioned factors. A further object is to provide a surface plug with a sinuous, wriggling and side-to-side darting action accompanied by a slight rolling motion which is attractive to fish. Another object is to provide a plug with an advantageous disposition of hooks and with a novel means of securing them to the plug in a manner which minimizes their interference with the action of the plug. Another object is to provide a plug of the type described which can be conveniently and economically manufactured in a variety of sizes, patterns, and designs which is attractive in appearance and sturdy and durable under all conditions of use.

These and other objects and advantages will more fully appear from the following description of our invention, reference being had to the accompanying drawings in which Figure 1 is a top plan view of a preferred form of our plug; Figure 2 is a side elevation of the plug of Figure 1; Figures 3 to 7 are sectional views taken through Figure 1 at lines 3—3, 4—4, 5—5, 6—6 and 7—7, respectively; Figure 8 is a bottom plan view of the plug of Figure 1; and Figure 9 is a fragmentary longitudinal medial section of the rear end of the plug.

A preferred form of our invention comprises a plug body 1 having laterally extending rearwardly disposed fins 2 and hooks 3 and 4 secured to the plug at the bottom and at the rear, respectively.

The geometry and shape of the body 1 can be ascertained more clearly by referring to the sections as shown in Figures 3-7, taken in conjunction with Figures 1, 2 and 9. Thus, the body is substantially ovate when viewed from above and presents a substantially flat although slightly concave top and a convex obtuse angular bottom contour when viewed in side profile. The bottom slants forwardly and upwardly from the middle to form a planing surface 5 which is so slightly rounded as to appear substantially flat. The bottom preferably tapers backwardly from the planing area in a somewhat similar fashion but immediately adjacent the rear levels off somewhat to form a seating surface for attaching the fins 2.

Preferably the plug together with its attachments is lighter than water so that it will float on the surface when cast out and retrieved. A preferred construction is to form such a body by assembling two complementary longitudinal shell-like halves molded from plastic and joined in a longitudinal watertight joint to form a hollow, buoyant body. However, any other convenient material and method of construction may be used, such as the use of wood or a hollow metal construction. Nor do we intend our invention to be limited to a buoyant surface plug, for the features to be described more fully will find utility and application in a surface plug having a body heavier than water.

The action or motion of the plug is induced in part by the laterally extending fins 2 which are preferably disposed adjacent the rear of the plug. The fins preferably extend downwardly and rearwardly at a slight angle with the horizontal axis and are preferably, though not necessarily, slightly concave with the concave surface facing forwardly. As we have shown them, the fins are identical, but it is within our invention to have them differ in concavity, in size, and in angular projection with respect to the plug, producing to the extent that they differ, an erratic action which may at times be found desirable. The fins may be molded integrally with the plug or may be separate parts secured thereto in any convenient manner. We prefer to connect the fins by a central plate portion 6 and to stamp them from metal in a single stamping. The plate 6 fits over and seats snugly under the rearward flat portion of the body as shown, see Figures 8 and 9, and desirably blends with the contour of the body so as to offer a minimum resistance to the water. It is preferably removably secured to the plug by screws 7 as shown.

The detrimental effect of attached hooks so far as inhibiting and damping the action of a plug is concerned, depends to a large extent upon its position and is most marked with respect to the rear hook 4. In this position the hook 4 is most effective as a rudder and its restraining force exerts a greater leverage. We overcome this undesirable effect by securing the rear hook to the body in a novel and advantageous manner, which gives the plug a wide range of movement relative to and independent of the damping action of the hook. To this end the hook is attached to the plug by a large clip or bail 8 which extends laterally a substantial distance, preferably the full width of the rear end of the plug.

The bail 8 preferably takes the form of a stiff wire clip bent to the shape shown in part in dotted lines in Figure 8 with rearwardly curved tips 9 which seat in appropriately shaped sockets 10 and which are locked firmly in place within the sockets by the plate 6 and the screws 7 which also hold the plate 6 to the plug. To insure a free sliding passage for the eye of the hook 4, the end of the plug is undercut as at 11 and the rear end of the plate 6 which extends close to the bail is bulged slightly outwardly to provide room for the eye of the hook. There is thus no tendency for the hook to bind as it slides laterally. We find it preferable to extend the plate 6 rearwardly close to the bail to limit the forward position of the rear hook 4 to an angle of about 90° to the longitudinal axis, making it virtually impossible for it to become entangled with the central hook 3.

While the central hook 3 may also be secured to the plug by a bail similar to bail 8, it appears to be relatively less necessary for, as will be explained later, it is located close to the center of gravity and the point of line attachment where its influence upon the desired plug movement is more limited. We find it convenient and desirable to attach the hook 3 to the plug by a clip 12, see Figures 2 and 8, secured to the plug by a screw 13 at the rear of the clip and by a screw eye 14 which extends through the front of the clip and is anchored in the plug. The clip 12 has a forward cap-like portion 15 and the rearward half of the clip comprises a narrow strip 16 over which the eye of the hook 3 loosely fits. The hook 3, thus attached, has a free lateral swinging movement of slightly more than 180° of arc before it is stopped by contact with the sides of the plug; its movement longitudinally of the plug is limited to about 120° of arc, the head of the screw 13 limiting its rearward movement, see Figure 2, and preventing it from becoming entangled with the rear hook 4 and its forward position is limited by the rear edge 17 of the cap portion 15 of the clip, tending to prevent it from becoming entangled with the line L which is connected to the plug at the screw eye 14.

We have found that the wriggling side-to-side darting action of our plug is induced in substantial part by the forward planing surface 5 whose influence is made effective by the attachment of the line L to the screw eye 14 at a point substantially at the rear of the planing surface as shown. This point of attachment is also preferably close to although somewhat forward of the center of gravity of the plug. When tension is put upon the line L to draw the plug through the water, by reason of the substantial mass forward of the point of attachment 14 as well as the planing surface the plug is free for pivotal action about this point and is sensitive to and responsive to those forces which induce the desired action. These forces are exerted not only by the planing surface 5 but by the fins 2 as well. When the plug darts from side-to-side, it rolls slightly about its longitudinal axis, the fins alternately catching and spilling water. As the plug rolls, the planing surface banks to facilitate the reversal of direction.

We have so disposed and attached the hooks so as to have a minimum interference with this action. With the rear bail method of attachment for the hook 4, the plug can take its movement substantially free of the inertia and rudder effect of the rear hook, the hook sliding the full length of the bail for each tacking movement of the plug and being free to slide is unable to exert any substantial restraining force upon the plug. The central hook 3 on the other hand is attached close to the point of line attachment 14 and close to the center of gravity of the plug and hence does not, by reason of this position exert any substantial influence.

The planing surface and the fins ensure a correct riding position of the plug. The forwardly and upwardly slanting planing surface keeps the plug upon or adjacent the surface of the water. The fins provide for stability about the longitudinal axis of the plug, preventing spinning about the longitudinal axis but nevertheless permitting and/or contributing to the rolling action as the plug tacks from side to side.

A modified form of our plug may be made by omitting the rear hook 4 and bail 8. In this form the planing surface 5 and fins 2 when free of the drag of the rear hook are able to produce an effective action. In this form the central hook may also be modified to take the form 3a suggested in dotted lines in Figure 2, the shank being bent slightly and extended to place the barbs near or somewhat beyond the rear end of the lure. A further modification comprises using either form of the hooks 3 or 3a, and omitting the rear fins.

While we have illustrated and described preferred and modified embodiments of our invention, further modifications, improvements and changes will appear to those skilled in the art within the spirit and teachings hereof, and while we have described our invention with especial regard to its advantages in a surface bait or lure we do not disclaim its utility in other embodiments or environments, and we do not care to be limited in any manner other than by the claim appended hereto.

We claim:

A fishing plug comprising a body having a substantially flat planing surface of substantial area extending forwardly and upwardly, means for attaching a line to said plug rearwardly of the center of said planing surface and close to and slightly forwardly of the center of gravity of said body, a pair of slightly concave fins located at the rear of said plug and projecting laterally and slightly downwardly and at a slight angle to the horizontal axis of said plug, the concave sides of said fins facing forwardly, a bail adapted to secure a hook to said body extending substantially the full width of the rear end of said plug and permitting lateral movement of said hook with respect to said plug, and a second hook attached to said plug by said means.

GEORGE B. ESPEY.
GILBERT D. WAITE.

REFERENCES CITED

The following references are of record in the file of this patent:

UNITED STATES PATENTS

| Number | Name | Date |
|---|---|---|
| 865,676 | Brown | Sept. 10, 1907 |
| 1,455,624 | Koch | May 15, 1923 |
| 1,553,933 | Dills | Sept. 15, 1925 |
| 1,581,833 | Bonnett | Apr. 20, 1926 |
| 1,600,653 | Steenstrup | Sept. 21, 1926 |
| 1,657,164 | Kendall | Jan. 24, 1928 |
| 1,681,316 | Waters | Aug. 21, 1928 |
| 1,795,773 | Green | Mar. 10, 1931 |
| 1,948,005 | Pflueger | Feb. 20, 1934 |
| 1,999,522 | Van Houten | Apr. 30, 1935 |
| 2,100,289 | Khoenle | Nov. 23, 1937 |
| 2,107,436 | Flanagan | Feb. 8, 1938 |
| 2,239,802 | Westby | Apr. 29, 1941 |
| 2,519,048 | Janisch | Aug. 15, 1950 |

FOREIGN PATENTS

| Number | Country | Date |
|---|---|---|
| 17,036 | Sweden | Sept. 30, 1901 |